(12) United States Patent
Cao et al.

(10) Patent No.: US 10,731,970 B2
(45) Date of Patent: Aug. 4, 2020

(54) METHOD, SYSTEM AND APPARATUS FOR SUPPORT STRUCTURE DETECTION

(71) Applicant: Zebra Technologies Corporation, Lincolnshire, IL (US)

(72) Inventors: Feng Cao, Burlington (CA); Harsoveet Singh, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/219,679

(22) Filed: Dec. 13, 2018

(65) Prior Publication Data

US 2020/0191559 A1    Jun. 18, 2020

(51) Int. Cl.
| | |
|---|---|
| *G01B 11/22* | (2006.01) |
| *G01B 11/25* | (2006.01) |
| *G06T 7/521* | (2017.01) |
| *G01S 17/89* | (2020.01) |
| *G06K 9/32* | (2006.01) |

(52) U.S. Cl.
CPC .......... *G01B 11/22* (2013.01); *G01B 11/254* (2013.01); *G01S 17/89* (2013.01); *G06K 9/3233* (2013.01); *G06T 7/521* (2017.01)

(58) Field of Classification Search
CPC ....... G01B 11/22; G01B 11/254; G06T 7/521; G01S 17/89; G06K 9/3233
See application file for complete search history.

(56) References Cited

U.S. PATENT DOCUMENTS

| | | | |
|---|---|---|---|
| 5,209,712 | A | 5/1993 | Ferri |
| 5,214,615 | A | 5/1993 | Bauer |
| 5,408,322 | A | 4/1995 | Hsu et al. |
| 5,414,268 | A | 5/1995 | McGee |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

Golovinskiy, Aleksey, et al. "Min-Cut based segmentation of point clouds." Computer Vision Workshops (ICCV Workshops), 2009 IEEE 12th International Conference on. IEEE, 2009.

(Continued)

*Primary Examiner* — Jamil Ahmed

(57) ABSTRACT

A method of detecting a support structure in a navigational controller includes: controlling a depth sensor to capture a plurality of depth measurements corresponding to an area containing the support structure on a ground plane; generating, for each of the depth measurements, a projected depth measurement on the ground plane; selecting a boundary set of the projected depth measurements defining a boundary of the projection; selecting, based on angles between adjacent pairs of the boundary set of projected depth measurements, a subset of the projected depth measurements; generating a region of interest based on the subset of the projected depth measurements; retrieving a candidate subset of the depth measurements corresponding to the projected depth measurements in the region of interest; and generating a support structure plane definition based on the candidate subset of depth measurements.

20 Claims, 8 Drawing Sheets

(56) References Cited

U.S. PATENT DOCUMENTS

| | | |
|---|---|---|
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,600,731 B2 | 3/2017 | Yasunaga et al. |
| 9,600,892 B2 | 3/2017 | Patel et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,980,009 B2 | 5/2018 | Jiang et al. |
| 9,994,339 B2 | 6/2018 | Colson et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | Deluca |
| 10,352,689 B2 | 7/2019 | Brown et al. |
| 10,394,244 B2 | 8/2019 | Song et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |

(56) References Cited

U.S. PATENT DOCUMENTS

| | | |
|---|---|---|
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | VolKmann et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |

(56) References Cited

U.S. PATENT DOCUMENTS

| | | | |
|---|---|---|---|
| 2016/0171707 A1 | 6/2016 | Schwartz | |
| 2016/0185347 A1 | 6/2016 | Lefevre et al. | |
| 2016/0191759 A1 | 6/2016 | Somanath et al. | |
| 2016/0253735 A1 | 9/2016 | Scudillo et al. | |
| 2016/0313133 A1 | 10/2016 | Zang et al. | |
| 2016/0328618 A1 | 11/2016 | Patel et al. | |
| 2016/0353099 A1 | 12/2016 | Thomson et al. | |
| 2016/0364634 A1 | 12/2016 | Davis et al. | |
| 2017/0004649 A1 | 1/2017 | Collet Romea et al. | |
| 2017/0011281 A1 | 1/2017 | Dijkman et al. | |
| 2017/0011308 A1 | 1/2017 | Sun et al. | |
| 2017/0032311 A1 | 2/2017 | Rizzolo et al. | |
| 2017/0041553 A1 | 2/2017 | Cao et al. | |
| 2017/0066459 A1 | 3/2017 | Singh | |
| 2017/0074659 A1 | 3/2017 | Giurgiu et al. | |
| 2017/0150129 A1 | 5/2017 | Pangrazio | |
| 2017/0193434 A1 | 7/2017 | Shah et al. | |
| 2017/0219338 A1 | 8/2017 | Brown et al. | |
| 2017/0219353 A1 | 8/2017 | Alesiani | |
| 2017/0227645 A1 | 8/2017 | Swope et al. | |
| 2017/0227647 A1 | 8/2017 | Baik | |
| 2017/0228885 A1 | 8/2017 | Baumgartner | |
| 2017/0261993 A1 | 9/2017 | Venable et al. | |
| 2017/0262724 A1 | 9/2017 | Wu et al. | |
| 2017/0280125 A1 | 9/2017 | Brown et al. | |
| 2017/0286773 A1 | 10/2017 | Skaff et al. | |
| 2017/0286901 A1 | 10/2017 | Skaff et al. | |
| 2017/0323376 A1 | 11/2017 | Glaser et al. | |
| 2018/0001481 A1 | 1/2018 | Shah et al. | |
| 2018/0005035 A1 | 1/2018 | Bogolea et al. | |
| 2018/0005176 A1 | 1/2018 | Williams et al. | |
| 2018/0020145 A1 | 1/2018 | Kotfis et al. | |
| 2018/0051991 A1 | 2/2018 | Hong | |
| 2018/0053091 A1 | 2/2018 | Savvides et al. | |
| 2018/0053305 A1 | 2/2018 | Gu et al. | |
| 2018/0101813 A1 | 4/2018 | Paat et al. | |
| 2018/0114183 A1 | 4/2018 | Howell | |
| 2018/0143003 A1 | 5/2018 | Clayton et al. | |
| 2018/0174325 A1 | 6/2018 | Fu et al. | |
| 2018/0201423 A1 | 7/2018 | Drzewiecki et al. | |
| 2018/0204111 A1 | 7/2018 | Zadeh et al. | |
| 2018/0281191 A1 | 10/2018 | Sinyayskiy et al. | |
| 2018/0293442 A1 | 10/2018 | Fridental et al. | |
| 2018/0313956 A1 | 11/2018 | Rzeszutek et al. | |
| 2018/0314260 A1 | 11/2018 | Jen et al. | |
| 2018/0314908 A1 | 11/2018 | Lam | |
| 2018/0315007 A1 | 11/2018 | Kingsford et al. | |
| 2018/0315065 A1 | 11/2018 | Zhang et al. | |
| 2018/0315173 A1 | 11/2018 | Phan et al. | |
| 2018/0315865 A1 | 11/2018 | Haist et al. | |
| 2019/0057588 A1 | 2/2019 | Savvides et al. | |
| 2019/0065861 A1 | 2/2019 | Savvides et al. | |
| 2019/0073554 A1 | 3/2019 | Rzeszutek | |
| 2019/0180150 A1 | 6/2019 | Taylor et al. | |
| 2019/0197728 A1 | 6/2019 | Yamao | |
| 2019/0310652 A1* | 10/2019 | Cao | G01C 21/206 |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2019023249 | 1/2019 |

OTHER PUBLICATIONS

Hackel et al., "Contour Detection in unstructured 3D point clouds,"IEEE, 2016 Conference on Computer vision and Pattern recognition (CVPR), Jun. 27-30, 2016, pp. 1-9.

Hao et al., "Structure-based object detection from scene point clouds," Science Direct, v191, pp. 148-160 (2016).

Hu et al., "An improved method of discrete point cloud filtering based on complex environment," International Journal of Applied Mathematics and Statistics, v48, i18 (2013).

International Search Report and Written Opinion for corresponding International Patent Application No. PCT/US2016/064110 dated Mar. 20, 2017.

International Search Report and Written Opinion for corresponding International Patent Application No. PCT/US2017/024847 dated Jul. 7, 2017.

International Search Report and Written Opinion for International Application No. PCTAJS2019/025859 dated Jul. 3, 2019.

International Search Report and Written Opinion from International Patent Application No. PCT/US2018/030345 dated Sep. 17, 2018.

International Search Report and Written Opinion from International Patent Application No. PCT/US2018/030360 dated Jul. 9, 2018.

International Search Report and Written Opinion from International Patent Application No. PCT/US2018/030363 dated Jul. 9, 2018.

International Search Report and Written Opinion from International Patent Application No. PCT/US2019/025849 dated Jul. 9, 2019.

International Search Report and Written Opinion from International Patent Application No. PCT/US2019/064020 dated Feb. 19, 2020.

International Search Report and Written Opinion for International Patent Application No. PCTAJS2013/053212 dated Dec. 1, 2014.

International Search Report and Written Opinion for International Patent Application No. PCTAJS2013/070996 dated Apr. 2, 2014.

Jadhav et al. "Survey on Spatial Domain dynamic template matching technique for scanning linear barcode," International Journal of scieve and research v 5 n 3, Mar. 2016)(Year: 2016).

Jian Fan et al: "Shelf detection via vanishing point and radial projection", 2014 IEEE International Conference on image processing (ICIP), IEEE, (2014-10-27), pp. 1575-1578.

Kang et al., "Kinematic Path-Tracking of Mobile Robot Using Iterative learning Control", Journal of Robotic Systems, 2005, pp. 111-121.

Kay et al. "Ray Tracing Complex Scenes." ACM SIGGRAPH Computer Graphics, vol. 20, no. 4, ACM, pp. 269-278, 1986.

Kelly et al., "Reactive Nonholonomic Trajectory Generation via Parametric Optimal Control", International Journal of Robotics Research, vol. 22, No. 7-8, pp. 583-601 (Jul. 30, 2013).

Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.

Lecking et al: "Localization in a wide range of industrial environments using relative 3D ceiling features", IEEE, pp. 333-337 (Sep. 15, 2008).

(56) References Cited

OTHER PUBLICATIONS

Lee et al. "Statistically Optimized Sampling for Distributed Ray Tracing." ACM SIGGRAPH Computer Graphics, vol. 19, No. 3, ACM, pp. 61-67, 1985.
Li et al., "An improved Ransac for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 37, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
n. D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 19, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176181.
Park et al., "Autonomous mobile robot navigation using passiv rfid in indoor environment," IEEE, Transactions on industrial electronics, vol. 56, issue 7, pp. 23662373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", 2001-01-01, Digital Image Processing: PIKS Inside, New York: John Wily & Sons, US, pp. 243-258, 551.
Puwein, J., et al."Robust Multi-view camera calibration for wide-baseline camera networks,"In IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation-A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2014; San Jose, (Mar. 4, 2015).
Weber et al., "Methods for Feature Detection in Point clouds," visualization of large and unstructured data sets—IRTG Workshop, pp. 90-99 (2010).
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Facade Texturing, International Archives of the Photogrammetry, Remote Sensing and Spatial Information Sciences, pp. 867-872 (Jan. 2004).

(56) References Cited

OTHER PUBLICATIONS

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Chen et al. "Improving Octree-Based Occupancy Maps Using Environment Sparsity with Application to Aerial Robot Navigation" Robotics and Automation (ICRA), 2017 IEEE.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing ACM SIGGRAPH Computer Graphics", vol. 18, No. 3, ACM pp. 137-145, 1984.

Datta, a., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France. [hal-01097361].

Douillard, Bertrand, et al. "On the segmentation of 3D LIDAR point clouds." Robotics and Automation (ICRA), 2011 IEEE International Conference on IEEE, 2011.

Dubois, M., et al., "A comparison of geometric and energy-based point cloud semantic segmentation methods," European Conference on Mobile Robots (ECMR), pp. 88-93, 2527, Sep. 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Federico Tombari et al. "Multimodal cue integration through Hypotheses Verification for RGB-D object recognition and 6DOF pose estimation", IEEE International Conference on Robotics and Automation, Jan. 2013.

Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).

Glassner, "Space Subdivision for Fast Ray Tracing." IEEE Computer Graphics and Applications, 4.10, pp. 15-24, 1984.

Zhao Zhou et al.: "An Image contrast Enhancement Algorithm Using Plip-based histogram Modification", 2017 3rd IEEE International Conference on Cybernetics (CYBCON), IEEE, (Jun. 21, 2017).

Ziang Xie et al., "Multimodal Blending for High-Accuracy Instance Recognition", 2013 IEEE RSJ International Conference on Intelligent Robots and Systems, pp. 2214-2221.

* cited by examiner

METHOD, SYSTEM AND APPARATUS FOR SUPPORT STRUCTURE DETECTION

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

A mobile apparatus may be employed to perform tasks within the environment, such as capturing data for use in identifying products that are out of stock, incorrectly located, and the like. To perform such data capture operations, the mobile apparatus may be configured to track its location relative to a support structure holding the above-mentioned products. The complex and dynamic nature of such environments may render the detection of the support structure by the mobile apparatus inaccurate and/or computationally demanding.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
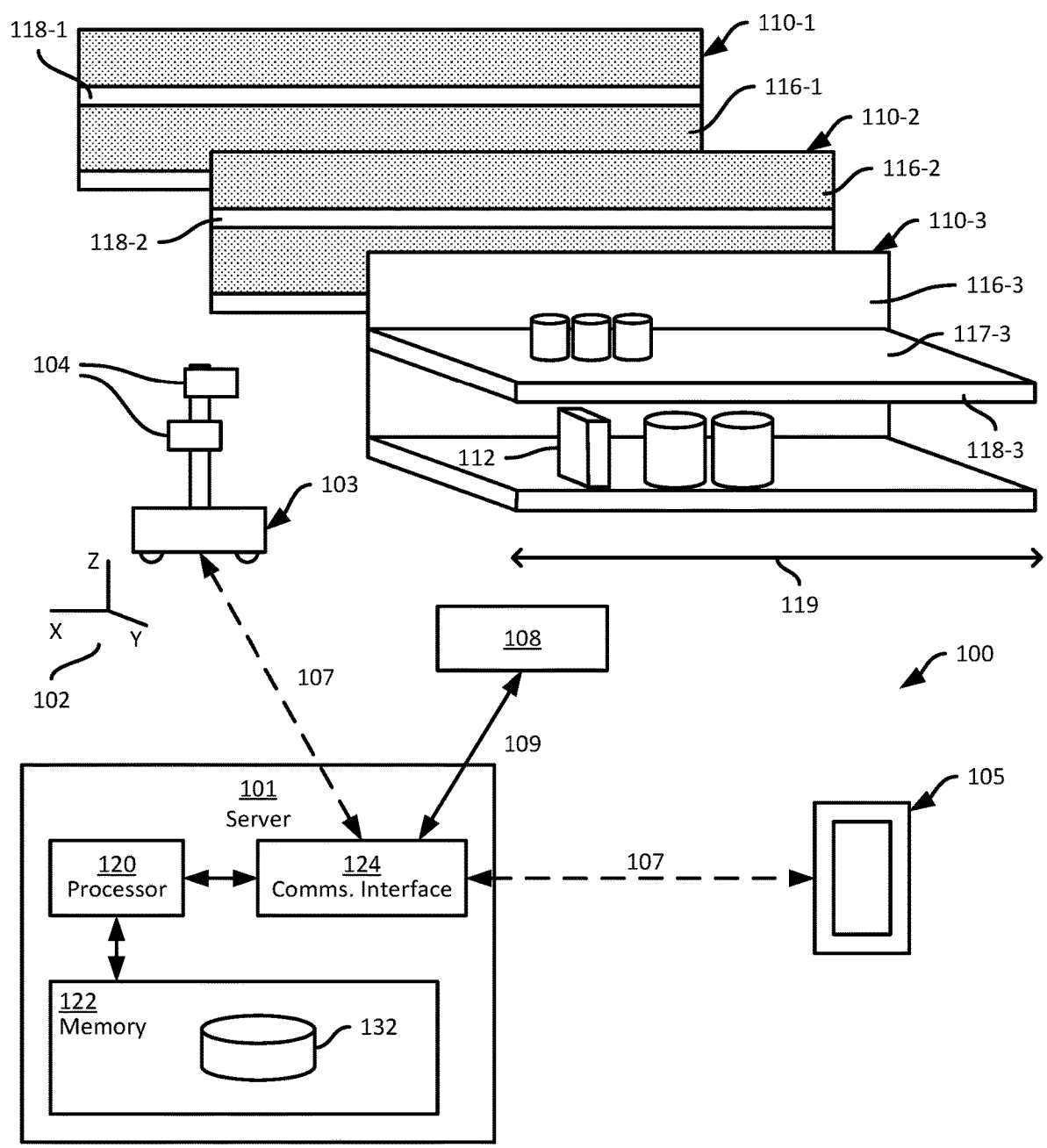
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of detecting a support structure in a navigational controller, the method comprising: controlling a depth sensor to capture a plurality of depth measurements corresponding to an area containing the support structure on a ground plane; generating, for each of the depth measurements, a projected depth measurement on the ground plane; selecting a boundary set of the projected depth measurements defining a boundary of the projection; selecting, based on angles between adjacent pairs of the boundary set of projected depth measurements, a subset of the projected depth measurements; generating a region of interest based on the subset of the projected depth measurements; retrieving a candidate subset of the depth measurements corresponding to the projected depth measurements in the region of interest; and generating a support structure plane definition based on the candidate subset of depth measurements.

Additional examples disclosed herein are directed to a mobile automation apparatus, comprising: a depth sensor; and a navigational controller connected to the depth sensor, the navigational controller configured to: control the depth sensor to capture a plurality of depth measurements corresponding to an area containing the support structure on a ground plane; generate, for each of the depth measurements, a projected depth measurement on the ground plane; select a boundary set of the projected depth measurements defining a boundary of the projection; select, based on angles between adjacent pairs of the boundary set of projected depth measurements, a subset of the projected depth measurements; generate a region of interest based on the subset of the projected depth measurements; retrieve a candidate subset of the depth measurements corresponding to the projected depth measurements in the region of interest; and generate a support structure plane definition based on the candidate subset of depth measurements.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of support structures such as shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. At each end of an aisle, one of the modules 110 forms an aisle endcap, with certain ones of the shelf edges 118 of that module 110 facing not into the aisle, but outwards from the end of the aisle. In some examples (not shown), endcap structures are placed at the ends of aisles. The endcap structures may be additional shelf modules 110, for example having reduced lengths relative to the modules 110 within the aisles, and disposed perpendicularly to the modules 110 within the aisles.

As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail environment, and communicates with the server 101 (e.g. via the link 107) to navigate, autonomously or partially autonomously, along a length 119 of at least a portion of the shelves 110. The apparatus 103 is configured to navigate among the shelves 110, for example according to a frame of reference 102 established within the retail environment. The frame of reference 102 can also be referred to as a global frame of reference. The apparatus 103 is configured, during such navigation, to track the location of the apparatus 103 relative to the frame of reference 102.

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 and to capture shelf data during such navigation.

The server 101 includes a special purpose controller, such as a processor 120, specifically designed to control and/or assist the mobile automation apparatus 103 to navigate the environment and to capture data. To that end, the server 101 is configured to maintain, in a memory 122 connected with the processor 120, a repository 132 containing data for use in navigation by the apparatus 103, such as a map of the retail environment.

The processor 120 can be further configured to obtain the captured data via a communications interface 124 for subsequent processing (e.g. to detect objects such as shelved products in the captured data, and detect status information corresponding to the objects). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for performing various functionality, including control of the apparatus 103 to navigate the modules 110 and capture shelf data, as well as post-processing of the shelf data. The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

Figure 2A:
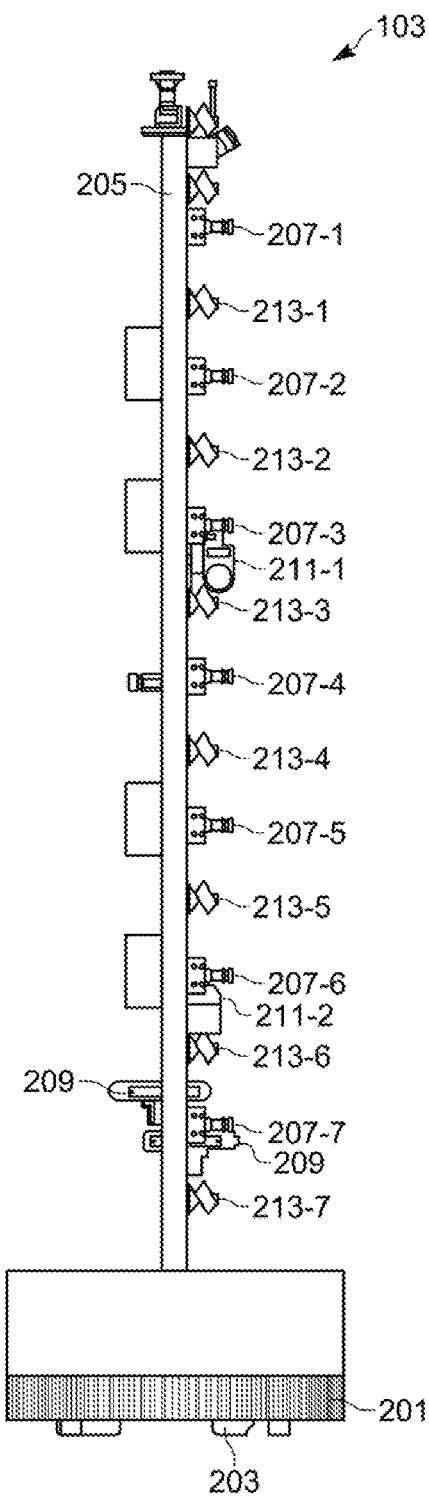
FIG. 2A depicts a mobile automation apparatus in the system of FIG. 1.
Figure 2B:
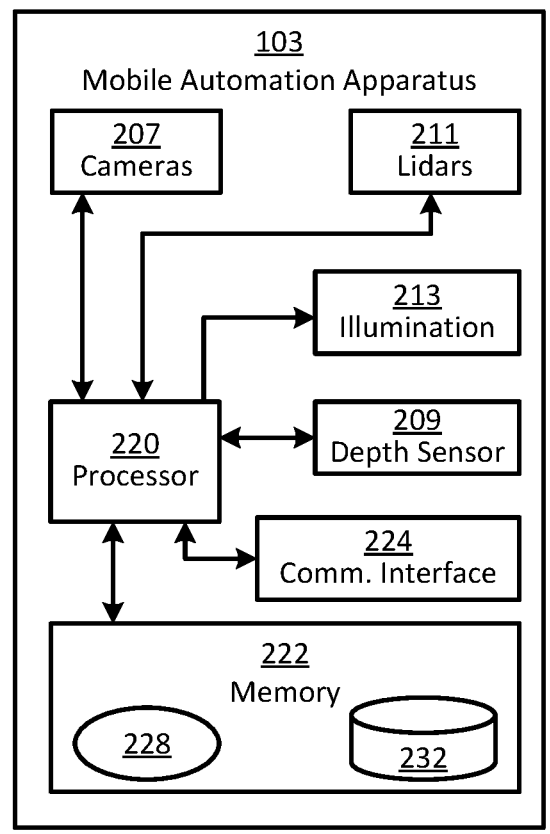
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera capable of capturing both depth data and image data. The apparatus 103 also includes additional depth sensors, such as LIDAR sensors 211. As shown in FIG. 2A, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is traveling. The apparatus 103 is configured to track a location of the apparatus 103 (e.g. a location of the center of the chassis 201) in a common frame of reference previously established in the retail facility, permitting data captured by the mobile automation apparatus to be registered to the common frame of reference.

The mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a navigational application 228 which, when executed by the processor 220, configures the processor 220 to perform various functions discussed below in greater detail and related to the navigation of the apparatus 103 (e.g. by controlling the locomotive mechanism 203). The application 228 may also be implemented as a suite of distinct applications in other examples.

The processor 220, when so configured by the execution of the application 228, may also be referred to as a navigational controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, a map of the environment in which the apparatus 103 operates, for use during the execution of the application 228. The apparatus 103 may communicate with the server 101, for example to receive instructions to navigate to specified locations (e.g. to the end of a given aisle consisting of a set of modules 110) and initiate data capture operations (e.g. to traverse the above-mentioned aisle while capturing image and/or depth data), via a communications interface 224 over the link 107 shown in FIG. 1. The communications interface 224 also enables the apparatus 103 to communicate with the server 101 via the dock 108 and the link 109.

In the present example, as discussed below, the apparatus 103 is configured to enable the above-mentioned traversal of aisles and capture of images and/or depth data depicting the modules 110 by detecting a support structure plane. The support structure plane is a plane containing the shelf edges 118. As will be apparent from FIG. 1, therefore, the support structure plane is typically vertical, and indicates the boundary between the modules 110 and the aisles they define (i.e. the open space between the modules 110). The support structure plane is employed by the apparatus 103 during navigation and data capture, for example to update a localization of the apparatus 103, to maintain a predefined distance between the apparatus 103 and the modules 110 during data capture, and the like.

As will be apparent in the discussion below, in other examples, some or all of the processing performed by the server 101 may be performed by the apparatus 103, and some or all of the processing performed by the apparatus 103 may be performed by the server 101.

Figure 2C:
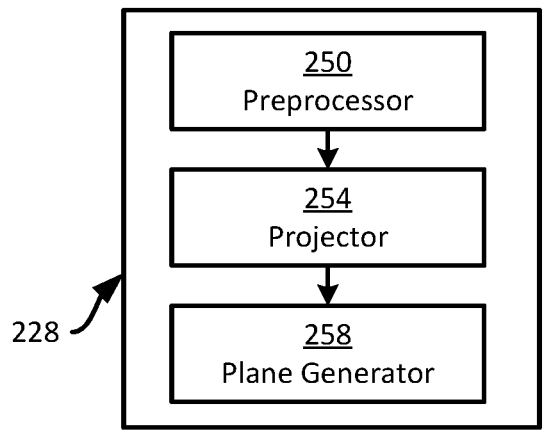
FIG. 2C is a block diagram of certain internal components of the mobile automation apparatus of FIG. 1.

Turning now to FIG. 2C, before describing the actions taken by the apparatus 103 to update localization data, certain components of the application 228 will be described in greater detail. As will be apparent to those skilled in the art, in other examples the components of the application 228 may be separated into distinct applications, or combined into other sets of components. Some or all of the components illustrated in FIG. 2C may also be implemented as dedicated hardware components, such as one or more ASICs or FPGAs.

The application 228 includes a preprocessor 250 configured to select a subset of depth measurements (e.g. from a point cloud captured by the depth sensor 209) for further processing to detect the support structure plane mentioned above. The application 228 also includes a projector 254 configured to generate a two-dimensional projection of the depth measurements, and to select a candidate subset of the depth measurements based on the projection. The application 228 also includes an plane generator 258, configured to generate, based on the subset of the depth measurements resulting from the actions undertaken by the preprocessor 250 and the projector 254, a support structure plane containing the shelf edges 118.

Figure 3:
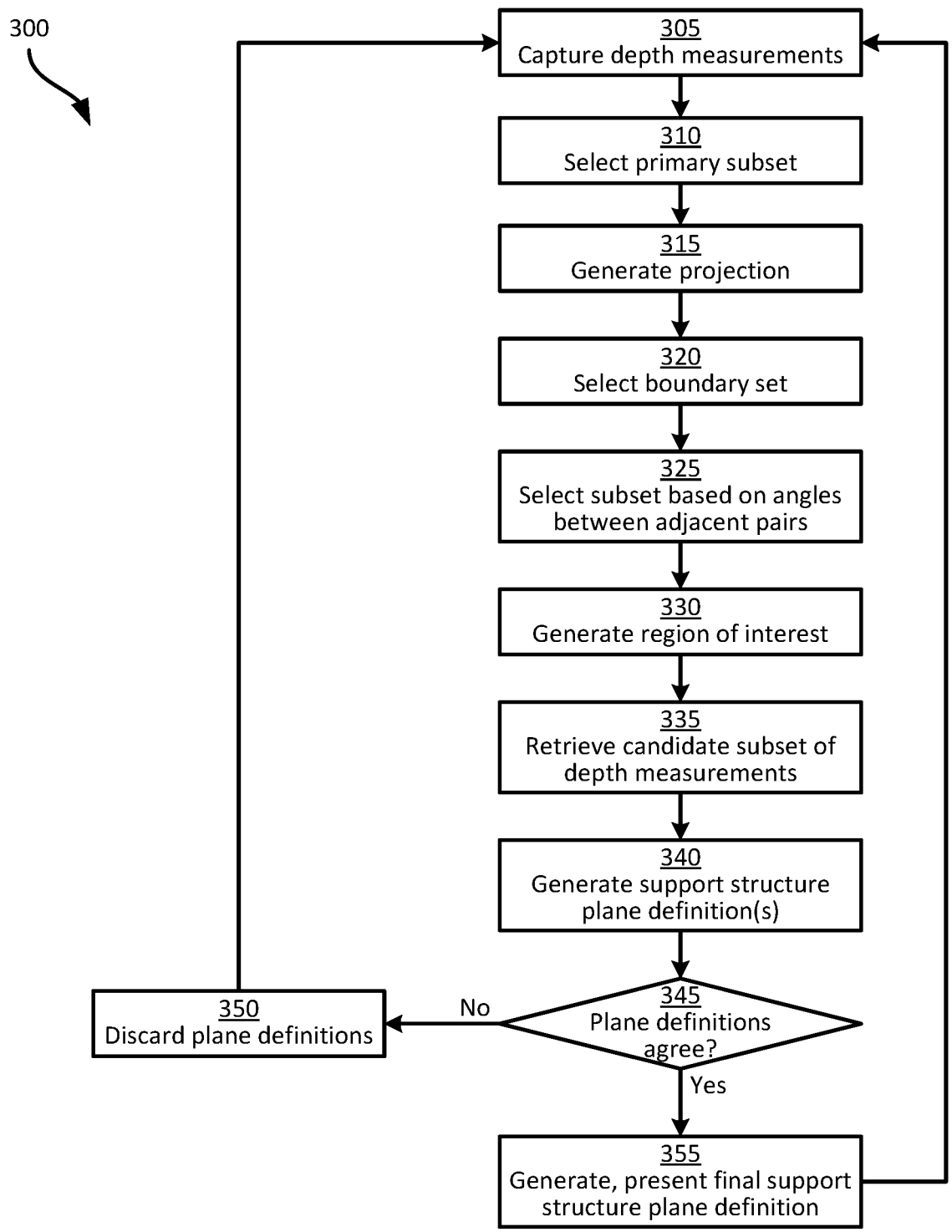
FIG. 3 is a flowchart of a method of support structure detection for the mobile automation apparatus of FIG. 1.

The functionality of the application 228 will now be described in greater detail, with reference to FIG. 3. FIG. 3 illustrates a method 300 of support structure detection, which will be described in conjunction with its performance in the system 100, and in particular by the apparatus 103, with reference to the components illustrated in FIGS. 2A-2C.

At block 305, the apparatus 103, and in particular the preprocessor 250 of the application 228, is configured to capture a plurality of depth measurements, also referred to as depth data or a point cloud. In the present example, the depth measurements are captured via control of the depth sensor 209 (i.e. the 3D digital camera), the LIDAR sensors 211, or a combination thereof. The point cloud captured at block 305 is typically defined in a frame of reference centered on the apparatus 103 itself (e.g. a center of the chassis 201).

The apparatus 103 is configured to perform block 305, for example, while traveling within an aisle defined by one or more support structure modules 110. For example, the apparatus 103 can receive a command from the server 101 to travel to a specified aisle and begin a data capture process to capture images and depth measurements along the length 119 of the aisle. While traveling through the aisle, the apparatus 103 can be configured to control not only the cameras 207 to capture images of the support structures for subsequent processing (e.g. by the server 101), but also the depth sensor 209 and/or LIDAR sensors 211 to capture depth data.

Figure 4A:
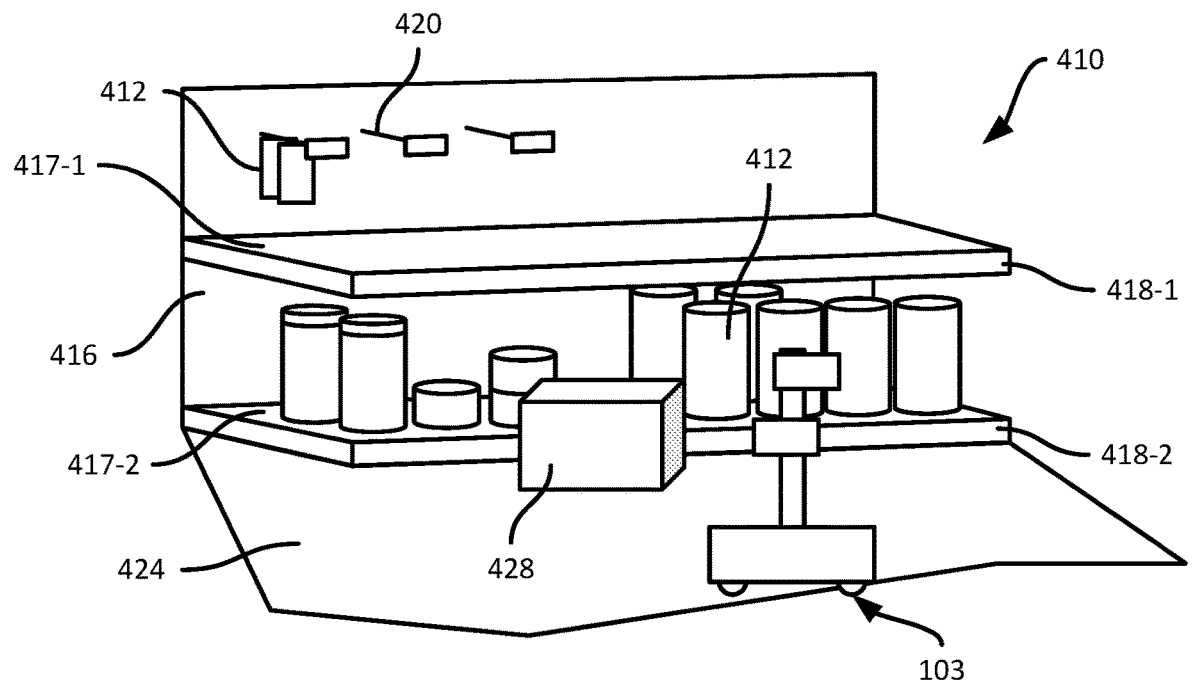
FIG. 4A is a perspective view of a portion of an aisle in which the mobile automation apparatus of FIG. 1. travels.

FIG. 4A illustrates a portion of a module 410, at which the apparatus 103 has arrived to initiate a data capture operation (e.g. responsive to an instruction received from the server 101). The module 410 includes a pair of support surfaces 417-1 and 417-2 extending from a shelf back 416 to respective shelf edges 418-1 and 418-2. The support surface 417-2 supports products 412 thereon, while the support surface 417-1 does not directly support products 412 itself. Instead, the shelf back 416 supports pegs 420 on which additional products 412 are supported. A portion of a ground surface 424 (e.g. the floor of the facility), along which the apparatus 103 travels and corresponding to the X-Y plane in the frame of reference 102 (i.e. having a height of zero on the Z axis of the frame of reference 102), is also illustrated. As shown in FIG. 4A, an object 428 such as a misplaced box appears on the ground surface 424 adjacent to the shelf edge 418-2. As will be discussed below in greater detail, via the performance of the method 300, the apparatus 103 is configured to process the depth measurements captured at block 305 to mitigate the impact of the object 428 on the accuracy of the detected support structure plane.

Figure 4B:
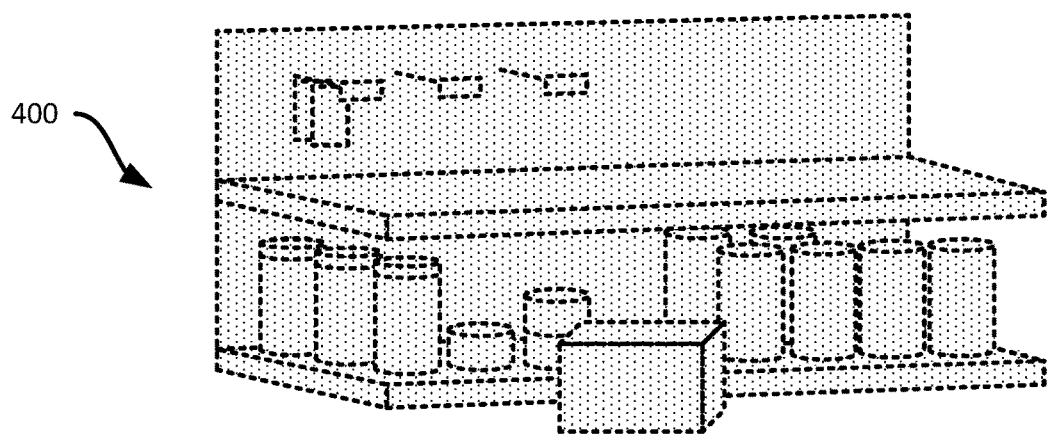
FIG. 4B is a diagram illustrating depth measurements captured by the mobile automation apparatus of FIG. 1 at the aisle shown in FIG. 4A during the performance of the method of FIG. 3.

FIG. 4B illustrates an example of the data captured at block 305. In particular, FIG. 4B illustrates a set of depth measurements corresponding to the module 410, in the form of a point cloud 400. As will be apparent from FIG. 4B, the ground surface 424 is not represented in FIG. 4B. The preprocessor 250 may be configured, for example, to discard any captured depth measurements located on a ground plane (i.e. the XY plane of the frame of reference 102) before further processing.

Returning to FIG. 3, at block 310 the preprocessor 250 is configured to select a primary subset of the depth data captured at block 305. In other embodiments, the performance of block 310 may be omitted. In the present embodiment, however, the primary subset of depth measurements is selected to reduce the volume of depth measurements to be processed through the remainder of the method 300, while retaining structural features that the apparatus 103 is configured to detect in order to locate the support structure plane containing the shelf edges 418. In the present example, the primary subset is selected at block 310 by selecting depth measurements within a predefined threshold distance of the chassis 201, the sensor 209 or the like. That is, the primary subset excludes depth measurements at a greater distance from the apparatus 103 than the threshold.

Figure 5A:
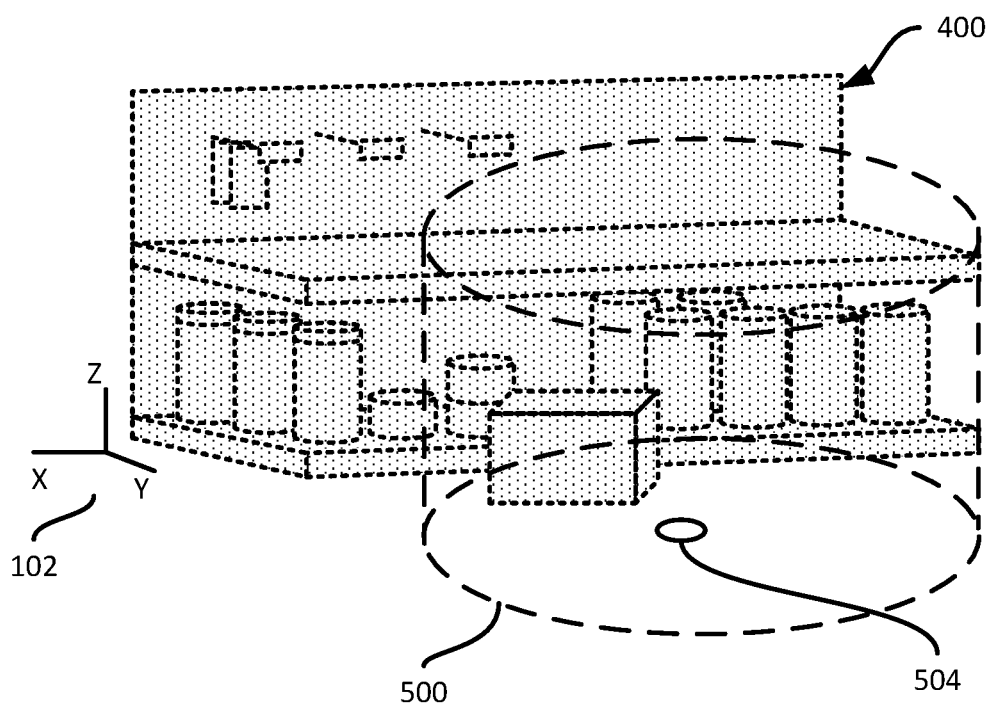
FIG. 5A is a diagram illustrating the selection of a primary subset of the depth measurements of FIG. 4B.

More specifically, in the present example the preprocessor 250 is configured to select the primary subset by selecting any depth measurements from the point cloud 400 that fall within a primary selection region, such as a cylindrical region of predefined dimensions and position relative to the apparatus 103. Turning to FIG. 5A, an example cylindrical selection region 500 is illustrated, centered on a location 504 of the apparatus 103 (e.g. the center of the chassis 201). The region 500 has a predefined diameter that is sufficiently large to capture at least a portion of the shelf edges 418. The region 500 also has a predefined height (i.e. a distance from the base to the top of the cylinder) selected to encompass substantially the entire height of the module 410 (e.g. about 2 meters).

Returning to FIG. 3, at block 315 the projector 254 is configured to generate projected depth measurements corresponding to each of the depth measurements captured at block 305. In other words, the projector 254 is configured to generate a two-dimensional projection of the primary subset of the point cloud 400 selected at block 310. In particular, the projector 254 is configured to project the depth measurements of the primary subset onto the ground plane (i.e. the XY plane containing the ground surface 424), by discarding the height dimension of each depth measurement and retaining only the other two dimensions.

Figure 5B:
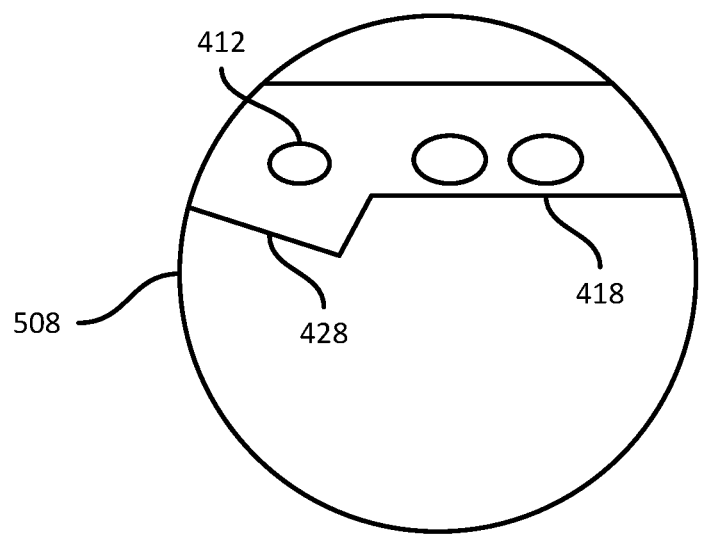
FIG. 5B is a diagram illustrating a projection of the primary subset of the depth measurements of FIG. 5A.

FIG. 5B illustrates a projection 508 of the portion of the point cloud 400 within the selection region 500. A portion of the object 428 is represented in the projection 508, as are certain products 412 and the shelf edges 418. As will be apparent, the shelf edges 418 appear substantially overlapping one another in the projection 508, as the shelf edges 418 have similar positions in the X and Y dimensions.

Referring again to FIG. 3, at block 320 the projector 254 is configured to select a boundary set of the projected depth measurements. The boundary set contains the projected depth measurements that define a boundary of the projection 508. That is, the boundary set contains the projected depth measurements that are closest to the aisle, facing towards the location 504 of the apparatus 103. Because the shelf edges 418 are typically the structural features of the module 410 extending furthest into the aisle, the boundary set is likely to contain projected depth measurements corresponding to the edges 418, while eliminating many of the depth measurements corresponding to products 412, support surfaces 417, and the like.

Figure 6A:
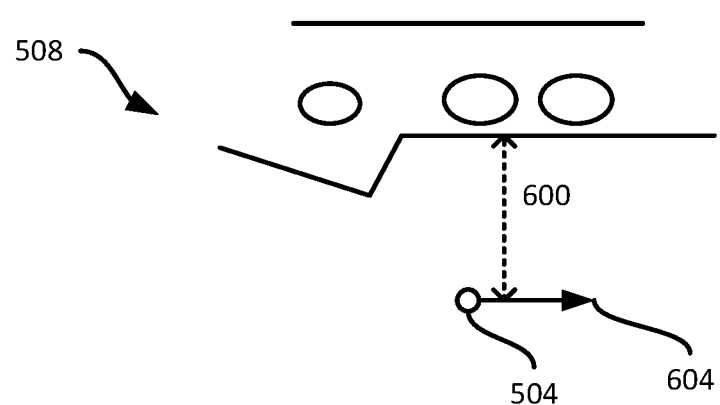
FIGS. 6A-6B are diagrams illustrating the selection of a boundary set of points from the projection of FIG. 5B.
Figure 6B:
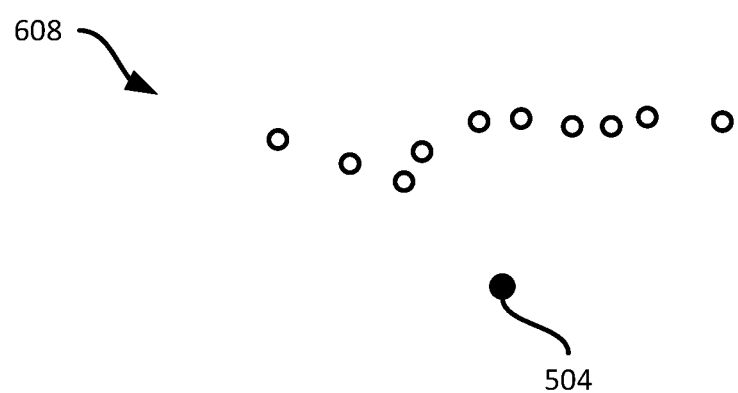

Selection of the boundary set can be performed via various mechanisms. For example, referring to FIG. 6A, the projector 254 can be configured to assess a distance 600 for each projected depth measurement. The distance 600 is the distance between the measurement itself and a plane defined by a direction of travel 604 of the apparatus 103. The projector 254 can be configured, for example, to select the projected depth measurement having the smallest distance 600 from each of a plurality of neighborhoods containing a predefined number of projected depth measurements, having a predefined radius, or the like. FIG. 6B illustrates a boundary subset 608 of projected depth measurements selected from the projection 508.

Figure 7A:
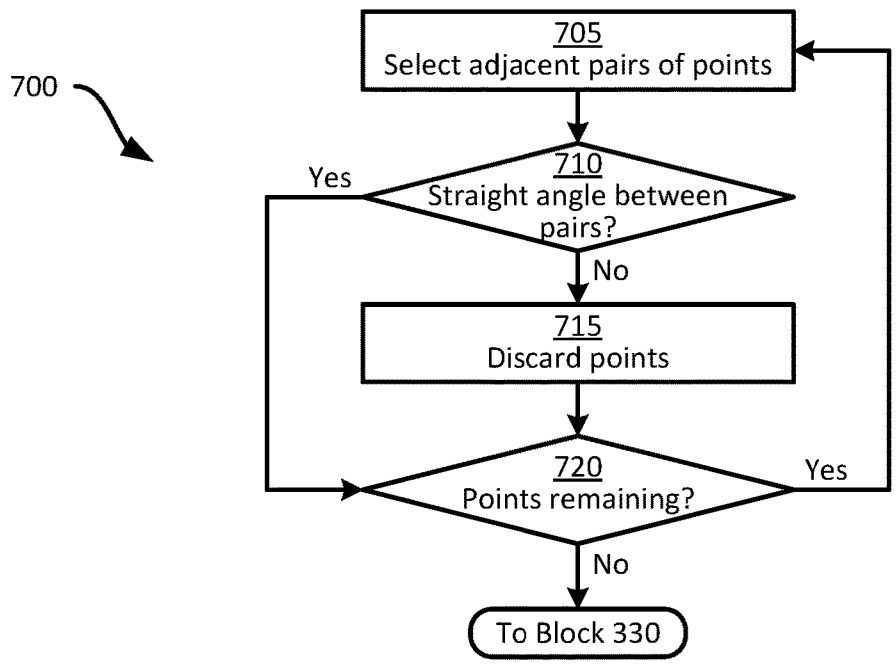
FIG. 7A is a flowchart of a method for performing block 325 of the method of FIG. 3.

Referring again to FIG. 3, at block 325 the projector 254 is configured to select a subset of projected depth measurements from the boundary set selected at block 320. The subset selected at block 325 are selected based on angles between adjacent pairs of projected depth measurements. Referring to FIG. 7A, a method 700 of performing block 325 is illustrated. Specifically, at block 705 the projector 254 is configured to select adjacent pairs of projected depth measurements. That is, the projector 254 is configured to select three projected depth measurements, forming two adjacent pairs (with the middle point being a member of both pairs). At block 710, the projector 254 is configured to determine whether and angle between the selected pairs is a straight angle (i.e. equal to 180 degrees). The determination at block 710 can include the application of a threshold, e.g. within a predefined angle of a straight angle. When the determination at block 710 is negative, the adjacent pairs of points are discarded (i.e. not included in the subset) at block 715. When the determination at block 710 is affirmative, the projector 254 retains the adjacent pairs of points, and determines at block 720 whether further points in the boundary subset 608 remain to be processed.

Figure 7B:
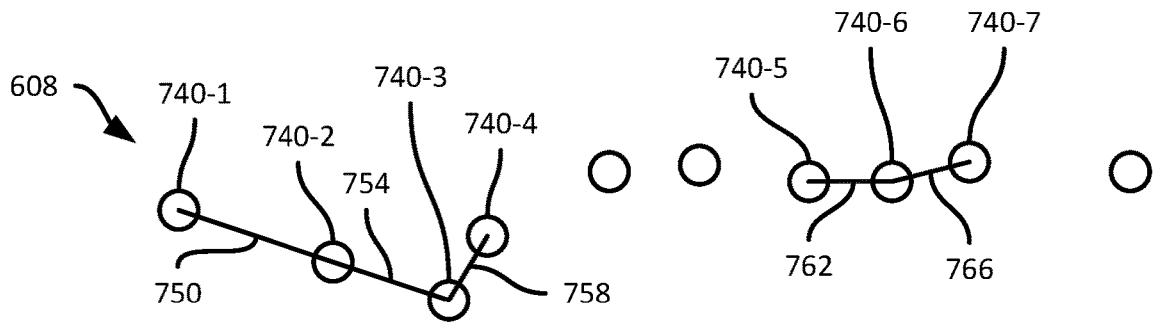
FIGS. 7B and 7C are diagrams illustrating the performance of the method of FIG. 7A.

FIG. 7B illustrates three example performances of the method 700. In a first example performance, the points 740-1, 740-2 and 740-3, forming two adjacent pairs, are selected. At block 710, the angle between the segments 750 and 754 is evaluated. As seen in FIG. 7B, the angle is 180 degrees, and the projector 254 therefore proceeds to the next adjacent pairs, without discarding any of the points 740-1, 740-2 and 740-3. The next adjacent pairs processed are the points 740-2, 740-3 and 704-4. As seen in FIG. 7B, the angle between the segments 754 and 758 is not straight, and the points 740-2, 740-3 and 704-4 are therefore discarded at block 715. The above procedure is repeated for the remainder of the points in the boundary set 608. In a further example, the points 740-5, 740-6 and 740-7 are evaluated. Although the angle between the segments 762 and 766 is not exactly straight, it is assumed that the angle is within the above-mentioned threshold of 180 degrees, and the determination at block 710 is therefore affirmative.

Figure 7C:
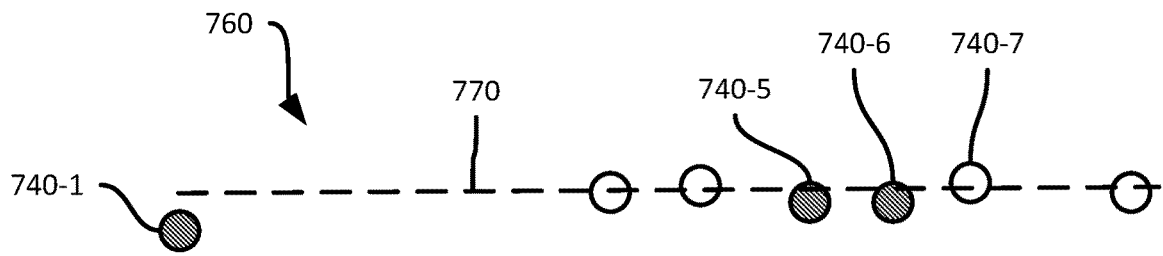

FIG. 7C illustrates an example subset of projected depth measurements 760 resulting from the processing of the boundary set 608 via the method 700. As seen in FIG. 7C, the points 740-1, 740-5, 740-6 and 740-7 are included in the subset 760, while the points 740-2 and 740-3 are omitted. As will also be apparent, the points 740-1 to 740-4 correspond to the object 428. Performance of the method 700, in other words, serves to mitigate the impact of objects such as the object 428 on support structure plane detection by reducing the representation of such objects in the depth data processed to detect the shelf structure plane.

Returning to FIG. 3, at block 330 the projector 254 is configured to generate a region of interest based on the subset of projected depth measurements selected at block 325. The region of interest, in the present example, the region of interest is a line fitted to the subset of projected depth measurements, obtained via linear regression. Turning again to FIG. 7C, a region of interest 770 in the form of a line fitted to the subset 760 is illustrated. The points of the subset 760 that are shaded (including the points 740-1, 740-5 and 740-6) do not lie on the line 770, and are therefore not selected for further processing at block 330.

Figure 8A:
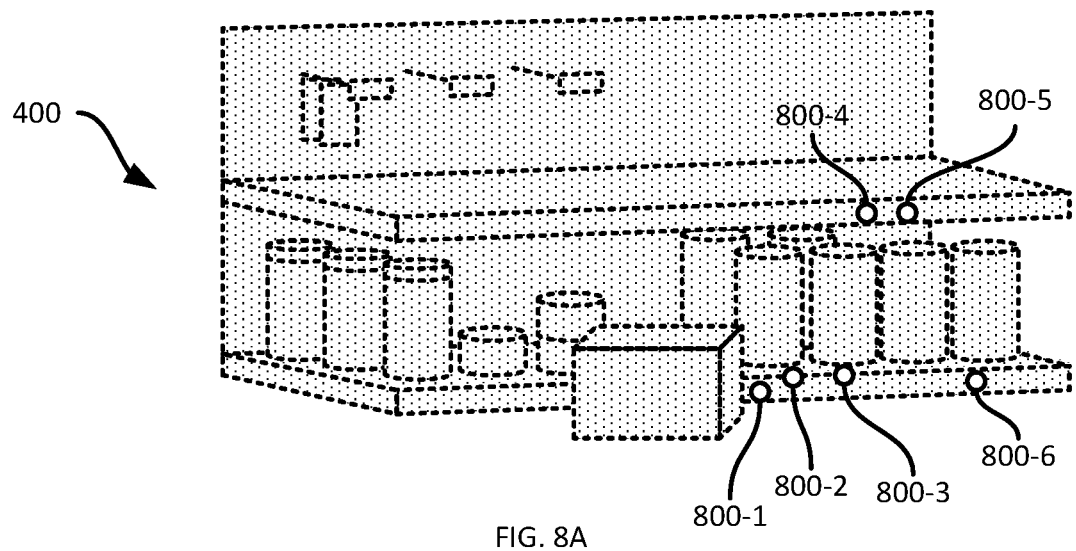
FIG. 8A is a diagram illustrating a candidate subset of depth measurements used in plane generation in the method of FIG. 3.

At block 335, the apparatus 103, and in particular the plane generator 258, is configured to retrieve a candidate subset of the depth measurements captured at block 305, that correspond to projected depth measurements lying within the region of interest 770. In other words, the plane generator 258 is configured to retrieve the Z dimensions of each of the points of the subset 760 lying on the line 770, thus re-projecting the selected points into three dimensions. FIG. 8A illustrates the reprojection of the un-shaded points of FIG. 7C (i.e. of the depth measurements whose two-dimensional projections are within the region of interest 770). In particular, the point cloud 400 is illustrated for reference, and a candidate subset of four depth measurements 800-1, 800-2, 800-3, 800-4, 800-5 and 800-6 corresponding to the un-shaded points in FIG. 7C are illustrated. As will now be apparent, the depth measurement 800-3 corresponds to the projected depth measurement 740-7 in FIG. 7C. As will also be apparent, each of the four depth measurements retrieved at block 335 represents a portion of a shelf edge 418.

At block 340, the plane generator 258 is configured to generate one or more support structure plane definitions using the candidate subset of depth measurements 800. In some examples, the plane generator 258 is configured to generate a single plane definition from the candidate subset 800. For example, the plane generator 258 can be configured to fit a plane to the candidate subset 800 according to a suitable plane-fitting operation, such as adaptive random sample consensus (RANSAC) or the like. When a single plane is generated at block 340, blocks 345 and 350 are omitted, and the performance of the method 300 proceeds directly to block 355, at which a final support structure plane definition is generated and presented. The final support structure plane definition, in this example, is the single plane definition generated at block 340.

In other examples, however, the plane generator 258 is configured to generate at least two plane definitions at block 340, by applying distinct plane-fitting operations to the candidate subset 800. An example of a first plane-fitting operation includes the above-mentioned adaptive-RANSAC operation. In a second example plane-fitting operation, the plane generator 258 can be configured to select a further subset of depth measurements from the candidate subset 800. For example, the plane generator 258 can be configured to generate difference of normal (DoN) vectors for each of the depth measurements in the candidate subset 800, as set out by Ioannou Y. et al. in "Difference of Normals as a Multi-Scale Operator in Unorganized Point Clouds", *Proceedings of the* 2012 *Second International Conference on 3DIMPVT*, the contents of which is incorporated herein by reference.

The above-mentioned DoN vectors are generated by, for each point in the candidate subset 800, computing two normal vectors based on two different neighborhoods (e.g. using neighboring points in the point cloud 400 contained within different radii extending from the point in the candidate subset 800). The DoN vector is the difference between the two normal vectors. As will be understood by those skilled in the art, a greater magnitude associated with a DoN vector indicates greater variability in the physical structure surrounding the point under consideration. Conversely, a smaller magnitude associated with the DoN vector indicates less variability. That is, a smaller DoN vector indicates that the point of the candidate subset 800 is likely to lie on a planar surface, rather than on or near an edge. The plane generator 258 can therefore be configured to select a further subset from the candidate subset 800 by discarding any depth measurements in the candidate subset 800 with DoN vectors having magnitudes that exceed a predefined threshold. The plane generator 258 can then be configured to generate a support structure plane definition, e.g. via RANSAC.

Figure 8B:
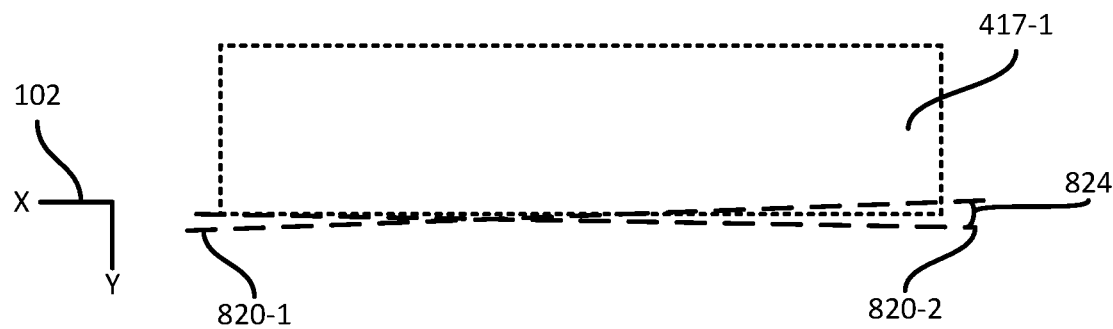
FIG. 8B is a diagram illustrating candidate planes generated at block 340 of the method of FIG. 3.

Referring to FIG. 8B, an overhead view of two support structure plane definitions 820-1 and 820-2 generated at block 340 is shown. At block 345, the plane generator 258 is configured to determine whether the plane definitions 820 agree within a predefined threshold. For example, the plane generator 258 can be configured to determine whether a difference between an attribute of the planes, such as the yaw angles (i.e. the angles of the planes relative to the XY plane) is within a predefined threshold. In other words, the plane generator 258 can be configured to determine whether an angle 824 between the planes 820 is below a predefined threshold (e.g. 10 degrees). When the determination at block 345 is negative, the planes 820 are discarded, and the performance of method 300 returns to block 305. When the determination at block 345 is affirmative, however, indicating sufficient agreement between the planes, the plane generator 258 is configured to proceed to block 355.

Figure 8C:
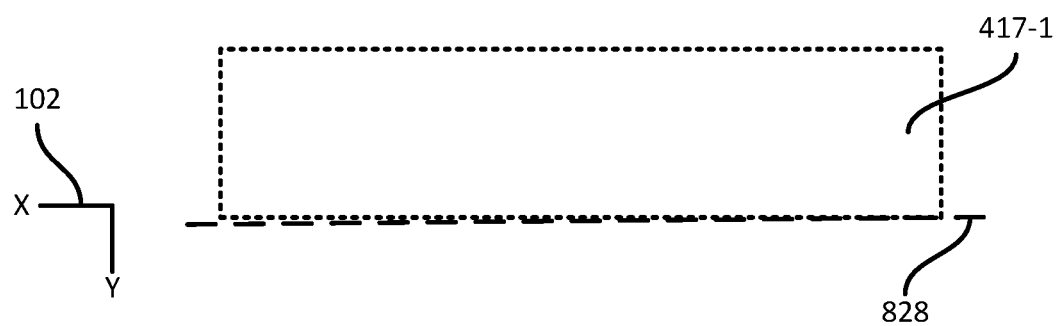
FIG. 8C is a diagram illustrating a final plane generated from the planes of FIG. 8B at block 355 of the method of FIG. 3.

As noted above, at block 355 the plane generator 258 is configured to generate a final support structure plane. When two or more planes are generated at block 340, at block 355 the plane generator 258 can be configured to generate a final plane definition by averaging the planes from block 340. FIG. 8C illustrates a final support structure plane 828 obtained by averaging the planes 820 from FIG. 8B. The plane generator 258 is then configured to present the final plane definition for display, transmission to the server 101 or client device 105, further processing for navigation within the apparatus 103, or the like. Following the performance of block 355, the apparatus 103 can return to block 305 to generate a further plane definition (e.g. as the apparatus 103 travels along the module 410)

Further validation operations can be performed at blocks 340 and 345, in some embodiments. For example, prior to comparing the planes 820 at block 345, the plane generator 258 can be configured to validate each plane individually. For example, the plane generator 258 can determine whether each plane 820 is within a threshold angle of having a vertical orientation (i.e. being perpendicular to the XY plane of the frame of reference 102). In a further example, the plane generator 258 determines whether a yaw angle of each plane 820 relative to the orientation of the apparatus 103 itself is below a threshold. When a plane 820 does not satisfy any of the above-mentioned validations, the plane 820 can be discarded. The plane generator 258 can be configured to proceed to block 355 with only the remaining plane, or to discard both planes and return to block 305.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting a support structure in a navigational controller, the method comprising:
controlling a depth sensor to capture a plurality of depth measurements corresponding to an area containing the support structure on a ground plane;
generating, for each of the depth measurements, a projected depth measurement on the ground plane;
selecting a boundary set of the projected depth measurements defining a boundary of the projection;
selecting, based on angles between adjacent pairs of the boundary set of projected depth measurements, a subset of the projected depth measurements;
generating a region of interest based on the subset of the projected depth measurements;

retrieving a candidate subset of the depth measurements corresponding to the projected depth measurements in the region of interest; and generating a support structure plane definition based on the candidate subset of depth measurements.

2. The method of claim 1, further comprising:

prior to generating the projection, selecting a primary subset of the depth measurements based on proximity to the mobile automation apparatus.

3. The method of claim 1, wherein selecting the subset of the projected depth measurements includes:

determining an angle for each of a plurality of adjacent pairs of the projected depth measurements; and when the angle deviates from a straight angle beyond a threshold, discarding the adjacent pairs of projected depth measurements.

4. The method of claim 1, wherein generating the region of interest comprises fitting a line to the subset of the projected depth measurements.

5. The method of claim 1, wherein generating the support structure plane includes:

executing first and second plane generation operations to generate first and second candidate plane definitions; and generating the support structure plane based on the first and second candidate plane definitions.

6. The method of claim 5, wherein generating the support structure plane based on the first and second candidate plane definitions comprises:

determining whether an attribute of each the first and second candidate plane definitions differs by an amount greater than a threshold; and responsive to an affirmative determination, discarding at least one of the first and second candidate plane definitions.

7. The method of claim 5, wherein generating the support structure plane based on the first and second candidate plane definitions comprises generating an average of the first and second candidate plane definitions.

8. The method of claim 5, further comprising:

prior to generating the support structure plane, validating each of the first and second candidate plane definitions.

9. The method of claim 8, wherein validating each of the first and second candidate plane definitions comprises determining whether each of the first and second candidate plane definitions is substantially vertical.

10. The method of claim 5, wherein generating the second candidate plane definition comprises:

selecting a further subset of the depth measurements from the candidate subset; and generating the second candidate plane definition based on the further subset.

11. A mobile automation apparatus, comprising:

a depth sensor; and a navigational controller connected to the depth sensor, the navigational controller configured to:

control the depth sensor to capture a plurality of depth measurements corresponding to an area containing the support structure on a ground plane;

generate, for each of the depth measurements, a projected depth measurement on the ground plane;

select a boundary set of the projected depth measurements defining a boundary of the projection;

select, based on angles between adjacent pairs of the boundary set of projected depth measurements, a subset of the projected depth measurements;

generate a region of interest based on the subset of the projected depth measurements;

retrieve a candidate subset of the depth measurements corresponding to the projected depth measurements in the region of interest; and generate a support structure plane definition based on the candidate subset of depth measurements.

12. The mobile automation apparatus of claim 11, wherein the navigational controller is further configured, prior to generation of the projection, to select a primary subset of the depth measurements based on proximity to the mobile automation apparatus.

13. The mobile automation apparatus of claim 11, wherein the navigational controller is configured, to select the subset of the projected depth measurements, to:

determine an angle for each of a plurality of adjacent pairs of the projected depth measurements; and when the angle deviates from a straight angle beyond a threshold, discard the adjacent pairs of projected depth measurements.

14. The mobile automation apparatus of claim 11, wherein the navigational controller is configured, to generate the region of interest, to fit a line to the subset of the projected depth measurements.

15. The mobile automation apparatus of claim 11, wherein the navigational controller is configured, to generate the support structure plane, to:

execute first and second plane generation operations to generate first and second candidate plane definitions; and generate the support structure plane based on the first and second candidate plane definitions.

16. The mobile automation apparatus of claim 15, wherein the navigational controller is configured, to generate the support structure plane based on the first and second candidate plane definitions, to:

determine whether an attribute of each the first and second candidate plane definitions differs by an amount greater than a threshold; and responsive to an affirmative determination, discard at least one of the first and second candidate plane definitions.

17. The mobile automation apparatus of claim 15, wherein the navigational controller is configured, to generate the support structure plane based on the first and second candidate plane definitions, to generate an average of the first and second candidate plane definitions.

18. The mobile automation apparatus of claim 15, wherein the navigational controller is further configured, prior to generation of the support structure plane, to validate each of the first and second candidate plane definitions.

19. The mobile automation apparatus of claim 18, wherein the navigational controller is configured, to validate each of the first and second candidate plane definitions, to determine whether each of the first and second candidate plane definitions is substantially vertical.

20. The mobile automation apparatus of claim 15, wherein the navigational controller is configured, to generate the second candidate plane definition, to:

select a further subset of the depth measurements from the candidate subset; and generate the second candidate plane definition based on the further subset.

* * * * *